United States Patent
Klava et al.

(10) Patent No.: US 6,330,835 B1
(45) Date of Patent: Dec. 18, 2001

(54) SCOTCH YOKE MECHANISM FOR SECURE TRACK SLIDING

(75) Inventors: Stephen Andrew Klava; Justin Blair Bearak, both of Chicago, IL (US)

(73) Assignee: U.S. Filter Corporation, Palm Desert, CA (US)

( * ) Notice: Subject to any disclaimer, the term of this patent is extended or adjusted under 35 U.S.C. 154(b) by 0 days.

(21) Appl. No.: 09/478,786

(22) Filed: Jan. 6, 2000

(51) Int. Cl.[7] ............................. B27B 11/02; F16H 21/18
(52) U.S. Cl. ..................................... 74/50; 74/25
(58) Field of Search ........................ 74/50, 22 A, 25; 403/381, 338; 384/42; 414/752; 123/56 R; 137/624.18

(56) References Cited

U.S. PATENT DOCUMENTS

| | | |
|---|---|---|
| 2,301,967 | 11/1942 | Nosker et al. . |
| 3,451,276 * | 6/1969 | Wadlow et al. ............................ 74/50 |
| 3,813,132 * | 5/1974 | Sahm ...................... 384/42 |
| 3,821,903 | 7/1974 | Eminger . |
| 4,272,996 | 6/1981 | Sauerwein . |
| 4,685,342 * | 8/1987 | Brackett ..................... 74/50 |
| 4,825,820 * | 5/1989 | Morgan ................. 123/56 R |
| 4,939,944 | 7/1990 | Hou . |
| 5,078,017 * | 1/1992 | Zornes ...................................... 74/50 |
| 5,083,376 * | 1/1992 | Lentino ................ 74/50 X |
| 5,212,887 * | 5/1993 | Farmerie .............................. 74/50 X |
| 5,588,326 | 12/1996 | Stroter et al. . |
| 5,738,203 | 4/1998 | Crorey . |
| 6,155,555 * | 12/2000 | Maass ................... 414/752 |

FOREIGN PATENT DOCUMENTS

| | | |
|---|---|---|
| 602535 | 3/1926 | (FR) . |
| 762292 | 11/1956 | (GB) . |
| WO99/56046 | 11/1999 | (WO) . |

* cited by examiner

Primary Examiner—Thomas R. Hannon
Assistant Examiner—Colby Hansen
(74) Attorney, Agent, or Firm—Greer, Burns & Crain, Ltd.

(57) ABSTRACT

A reciprocating scotch yoke drive mechanism connectable to a motor drive shaft, includes a yoke member connectable to the shaft which moves the yoke member in a linear reciprocating motion and a guide having one or more slide tracks configured to define a reciprocal sliding path for the yoke member. The yoke member also has a sliding formation configured for slidingly engaging the slide track. And the sliding formation and the slide track have complementary configurations for maintaining alignment of the yoke member during reciprocal sliding motion and engagement of the yoke member in the slide track under a variety of angular stresses.

9 Claims, 2 Drawing Sheets

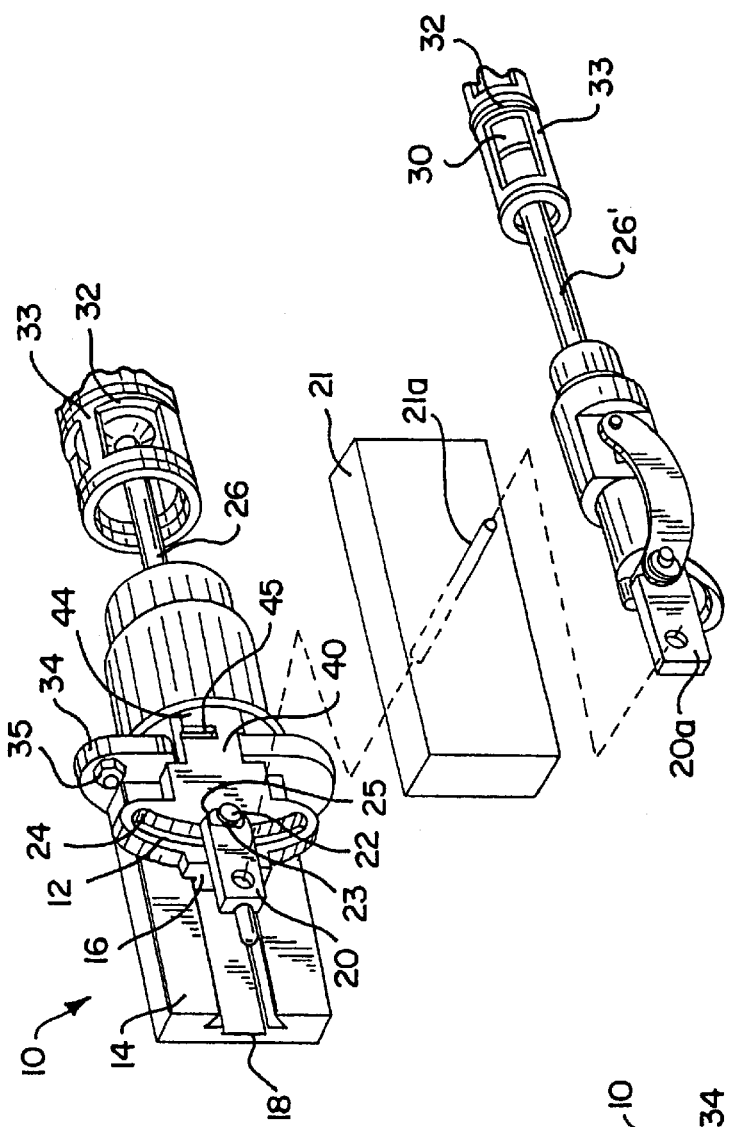
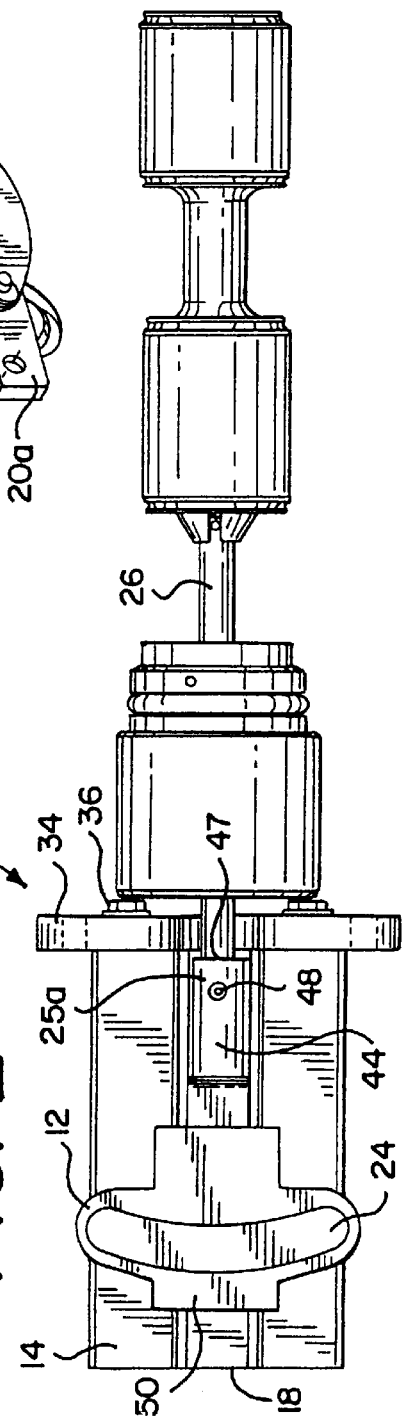
FIG. 1
FIG. 2

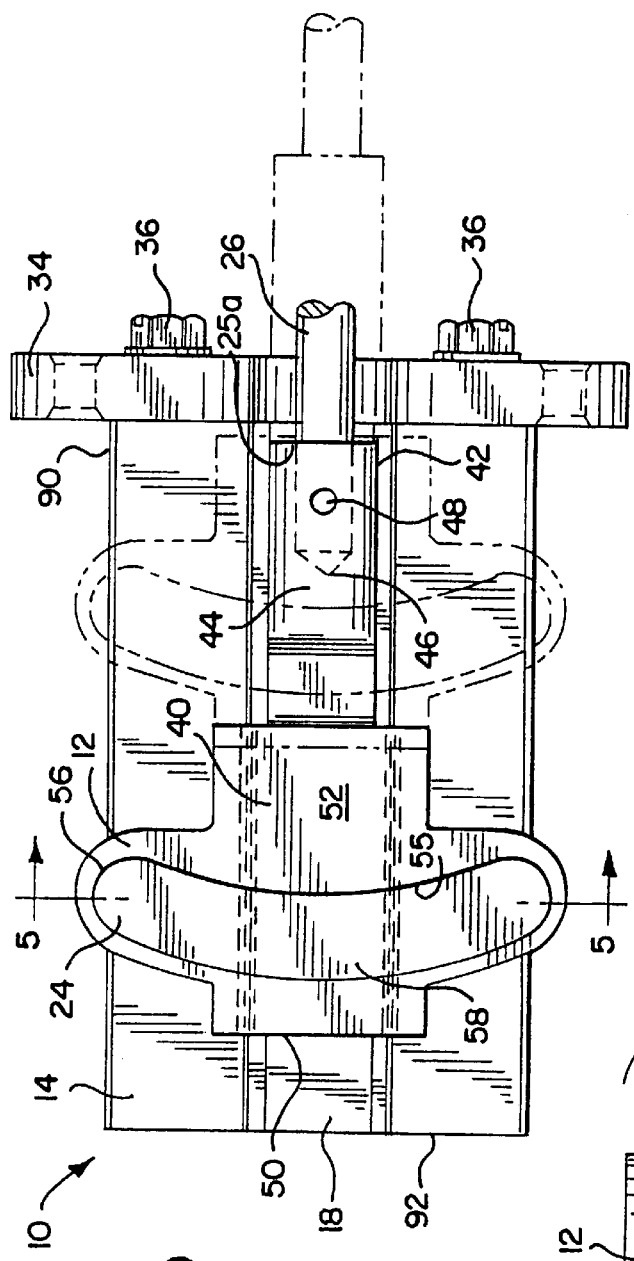
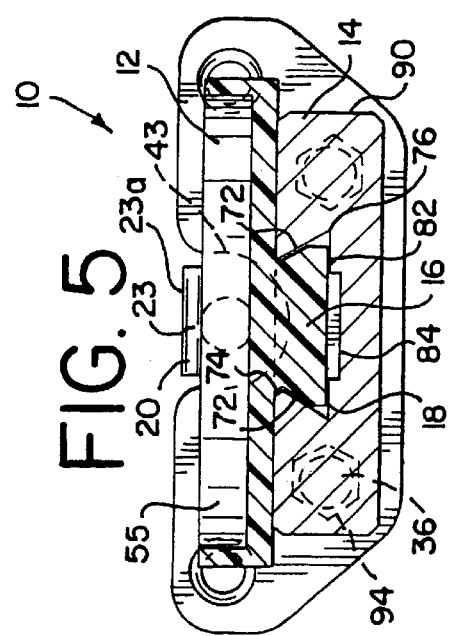
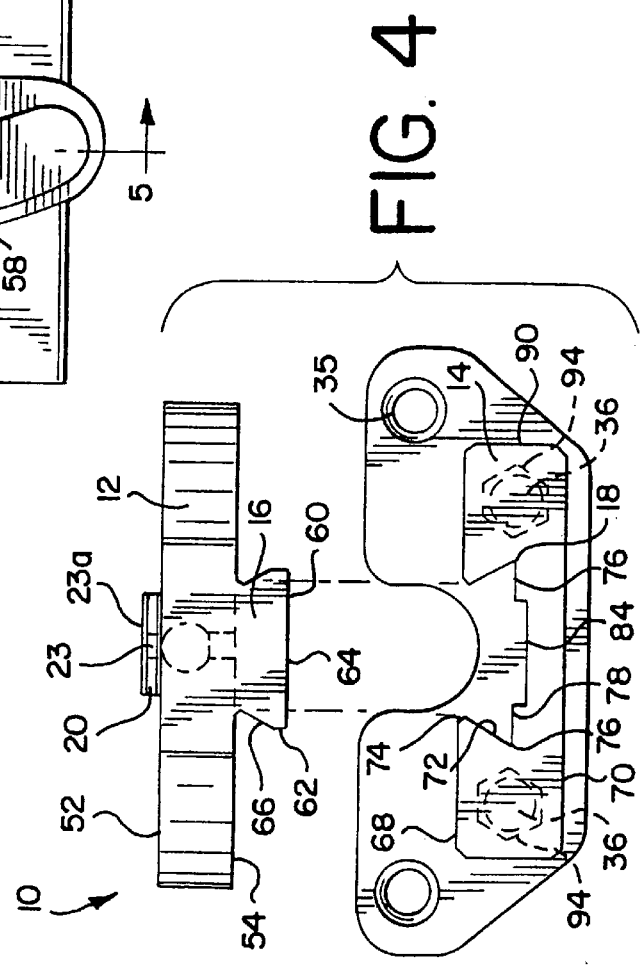

SCOTCH YOKE MECHANISM FOR SECURE TRACK SLIDING

BACKGROUND OF THE INVENTION

The present invention relates to reciprocating scotch yoke drive mechanisms or translating rotary motion to linear motion, and more particularly for serving in a valve control for a water softener.

It is common to use a scotch yoke to translate rotational movements of a motor drive shaft to reciprocating linear motion. In the case of a control valve for a water softener, it is common to use a scotch yoke drive mechanism to translate rotational movement from the motor drive shaft to linear reciprocal movement on a guide. In such applications, the scotch yoke allows the motor to control the reciprocal linear displacement of a valve control piston.

Conventionally, the scotch yoke member is coupled to the rotary drive source to linearly reciprocate on a track located on the guide. Preferably, the yoke member and the track have a corresponding, complementary rectangular configuration. One disadvantage of known scotch yoke valve control mechanisms is that because of the rotary to linear movement translation and the force exerted from the drive shaft, it is difficult to securely maintain the scotch yoke member in the track on the guide. Another problem with this conventional scotch yoke valve control is that it causes excessive wear on the yoke member and the guide.

Still another problem is that the rectangular configuration often cannot maintain the alignment of the yoke member, such as through component misalignment, causing it to become disengaged from the guide. When that happens, control is lost over the piston shaft attached to the scotch yoke drive mechanism, and the valve cannot be controlled.

Accordingly, a first object of the present invention is to provide an improved scotch yoke mechanism which has better wearability.

Another object of the present invention is to provide an improved scotch yoke mechanism which can better retain the yoke member in the guide by its ability to maintain yoke alignment under a variety of angular stresses.

Yet another object of the present invention is to provide an improved scotch yoke mechanism which maintains alignment of the yoke member in the face of extended operational use and wear.

BRIEF SUMMARY OF THE INVENTION

The above-listed objects are met or exceeded by the present scotch yoke drive mechanism, which features a yoke member with a dovetail sectional configuration for reciprocal sliding on a guide with a complementing slide track. A drive shaft connected to the yoke member provides the force necessary for the movement. As the yoke member receives the rotational movement from the drive shaft, it linearly reciprocates in a slide track located on the guide for movements of the attached piston shaft in order to control the water softener valve. In particular, a sliding formation on the yoke member actually reciprocates on the slide track. The present dovetail configuration greatly improves the consistent functioning of the scotch yoke drive mechanism because it can better maintain the sliding formation on the slide track of the guide. In addition, the more secure maintenance of the sliding formation on the sliding track translates into smoother sliding movements, resulting in better wearability since there is less friction between the sliding formation and the sliding track during operational reciprocating sliding motion. The dovetail configuration also greatly improves the conventional scotch yoke drive mechanism by its ability to maintain yoke alignment under a variety of angular stresses. Lastly, the specific dovetail configuration is also designed to maintain yoke alignment in the face of extended operational use and wear.

More specifically, the present reciprocating scotch yoke drive mechanism is connectable to a motor drive shaft. A yoke member is connectable to the shaft for movement in a linear reciprocal motion. A guide having one or more slide tracks is configured to define a reciprocal sliding path for the yoke member. The yoke member also has a sliding formation configured for slidingly engaging the slide track, and the sliding formation and the slide track have complementary configurations for maintaining alignment of the yoke member during reciprocal sliding motion and engagement of the yoke member in the slide track under a variety of angular stresses.

In another embodiment, the present invention provides a control valve for a water softener, which includes a drive motor with a drive shaft, at least one piston shaft disposed in a valve control cylinder, a yoke member connectable to a crank which moves the yoke member in a linear reciprocating motion, a guide having one or more slide tracks configured to define a reciprocal sliding path for the yoke member, the yoke member has a sliding formation configured for slidingly engaging the slide track, and the sliding formation and the slide track have complementary configurations for maintaining alignment of the yoke member during reciprocal sliding motion and engagement of the yoke member in the slide track under a variety of angular stresses.

BRIEF DESCRIPTION OF THE SEVERAL VIEWS OF THE DRAWINGS

FIG. 1 is an exploded top perspective view of the present scotch yoke drive mechanism with piston shaft attached;

FIG. 2 is a plan view of the present scotch yoke drive mechanism with a piston shaft attached to the yoke member;

FIG. 3 is a plan view of the present yoke member with the yoke formation on the slide track of the guide with a linear reciprocating sliding movement shown in phantom;

FIG. 4 is an exploded end elevational view of the present yoke member and guide; and FIG. 5 is a sectional view taken along the line 5—5 of FIG. 3 and in the direction indicated generally.

DETAILED DESCRIPTION OF THE INVENTION

Referring to now FIGS. 1 and 2, the present scotch yoke drive mechanism with attached piston shaft is generally indicated at 10. As shown in FIG. 1, the preferred embodiment of a yoke member 12 is placed slidably on top of a guide 14, wherein the yoke member 12 has a sliding formation 16 configured for linear reciprocal sliding movements on a slide track 18 located on the guide 14. A crank 20, engaged by a motor 21 having a motor drive shaft 21a, is connected to the yoke member 12 through a pin 22, such as a floating pin. In addition, the crank 20 is transversely connected to the motor drive shaft 21a in order to exert the rotational force generated by the motor drive shaft onto the pin 22. The pin 22 has two ends. The first end 23 is secured to the crank 20, while the second end (not shown) is placed in an arcuate slot 24 on the yoke member 12. It is preferred that the first end 23 of the pin 22 be held in place using an e-ring clip 25, or other known fastener which will allow for free rotation of the pin 22 generated by the crank 20. As is common to scotch yoke mechanisms, because of the pin 22 receiving the rotational movement generated by the crank 20, it moves within a path defined by the arcuate slot 24, which in turn causes the attached yoke member 12 to reciprocate linearly on the guide 14.

In particular, the sliding formation 16 of the yoke member 12 actually engages the slide track 18 of the guide 16 in the above-described linear reciprocal motion. Because the slide track 18 of the guide 14 allows only for reciprocating movements in a linear direction, all other angular forces which tend to misalign conventional scotch yoke valve controls are accommodated by the structure of the present sliding formation 16 and the slide track 18 while maintaining alignment. In this manner, the present scotch yoke drive mechanism 10 provides positive and efficient linear reciprocating motion to the yoke member 12. This positive linear reciprocal movement is transferred onto an associated valve piston shaft 26 connected to the other end of the yoke member 12.

Referring now to FIGS. 1 and 2, a first end 25a of the yoke member 12 is preferably configured to receive the piston shaft 26. Another piston shaft 26', is associated with a different valve control function and is manipulated by an opposite end of the motor drive shaft 21a using a crank 20a. The operation of the shaft 26' is not controlled by the present scotch yoke drive mechanism 10.

The piston shaft 26, is connected to a piston 30 forming a sealing plug 32, which is disposed within a cylinder 33. Since the yoke member 12 reciprocates with its attached piston shaft 26, the sealing plug 32 similarly slides within the cylinder 33. The linear displacement of the sealing plug 32 determines position and phase of the control valves of the water conditioner valve.

As shown in FIG. 1, a bracket 34 is mounted onto the guide 14 by threaded fasteners 36, preferably screws. However, it is contemplated that the bracket 34 may be secured to the guide 14 by other known fastening technologies, such as welding or chemical adhesives. At both ends of the bracket 34, there is a bore 35 configured for accommodating an associated threaded fastener for securing the guide 14 to the valve body (not shown). In the preferred embodiment, the bracket 34 is connected to a motor mount (not shown), which is in turn connected to the valve body. Commonly owned U.S. patent application Ser. No. 09/069, 916 entitled *Dual Cam Drive For Water Conditioner Valve* filed on Apr. 30, 1998 is herein incorporated by reference for a detailed explanation of the function and mechanics of a preferred water conditioner valve system.

Referring now to FIG. 3, the preferred yoke member 12 has a main body 40 with a first end 42 that is elongated, forming a neck 44 into which an end of the piston shaft 26 is inserted. It is preferred that the neck 44 is configured to have a "D" shape when viewed in cross-section with a lower semi-cylindrical surface and a flat upper surface 45. The lower semi-cylindrical surface is configured to be accommodated within a groove 43 (best seen in FIG. 5) in the bracket 34. The neck 44 also has a blind end bore or socket 46 (best seen in FIG. 3) configured for receiving the piston shaft 26. In the preferred embodiment, a transverse throughbore 48 is provided to the neck 44 to receive a set screw or similar fastener (not shown). Once the end of the piston shaft 26 is inserted into the blind end bore 46, the fastener is inserted into the throughbore 48 to secure the shaft in place. A truncated second end 50 of the main body 40 of the yoke member 12 is found opposite the neck 44.

Referring now to FIGS. 3 and 4, the main body 40 of the yoke member 12 has an upper surface 52 and lower surface 54. The arcuate slot 24 is located on the upper surface 48 of the main body 40. In the preferred embodiment, the yoke member 12 is made of a high strength, thermoformable plastic, such as Delrin, and the arcuate slot 24 is integrally formed with the yoke member by injection molding. However, it is also contemplated that the slot 24 could be machined into the yoke member 12.

More specifically, the arcuate slot 24 is formed by two arcuate, spaced, generally parallel walls 55 connected to each other at radiused ends 56, and a floor 58 to define an arcuate pathway for the floating pin 22 as it is moved by the crank 20. In fact, it is the configuration of the arcuate slot 24 which translates the rotational movement of the floating pin 22 into the desired linear movement of the yoke member 12.

Turning now to the lower surface 54, the sliding formation 16, which in the preferred embodiment, is the same length as the main body 40, is preferably integrally formed with two opposite ends 60, two parallel sides 62 and a bottom 64. It is preferred that the bottom 64 is planar for slidably engaging the slide track 18 during the linear reciprocal motion. In addition, about half way up each of the parallel sides 62, the sides are inclined slightly inward to form an elongated "V" shaped notch 66. As a result of these slightly inclined sides 62, the sliding formation 16 is provided with a dovetail shape as shown more clearly in FIG. 4.

Referring now to FIGS. 3–5, the slide track 18 of the guide 14 has a complementary dovetail configuration to slidingly accommodate the sliding formation 16. The guide 14 also has an upper surface 68 and a lower surface 70. The lower surface 70 is generally a flat smooth plane, which allows for easy and stable placement of the guide 14 or against any flat surface as desired. Unlike the lower surface 70, the upper surface 68 is not flat due to the existence of the slide track 18 with the complementary dovetail configuration.

More specifically, similar to the sides 62 of the sliding formation 16, the slide track 18 also has two side walls 72 that are slightly inclined. The slide track 18 also has an upper edge 74 and a lower edge 76 constructed and arranged such that the upper edges are closer to each other than the lower edges to form the inclined dovetail configuration. Also included on the slide track 18 is a floor 78 having a pair of generally parallel raised portions 82 which define a recess space 84 therebetween. The recess space 82 has the appearance of a lower track within the slide track 16.

An advantage of the recess space 84 is that it reduces the sliding surface area engaged by the sliding formation 16. As such, sliding friction is reduced. Again, less friction generally guarantees better wearablity, thereby improving the life of the scotch yoke mechanism 10. For improved wearability, the yoke member 12 is preferably made of Delrin, and the guide 14 is made of aluminum. This combination creates a low friction mating surface for the yoke member 16, which allows the majority of the force to be used for the piston shafts 26 through the sealing plugs 30. However, other rigid, durable, low friction materials are contemplated.

Again, the inclined walls 72 create the dovetail configuration. This complementing inclined angle of the dovetail configuration tends to lock the slide formation 16 into the sliding track 18. In other words, the complementary dovetail configuration is able to better maintain alignment of the sliding formation 16 in the slide track 18 during reciprocal sliding motion. As a result, the tendency for the sliding formation 16 to derail from the slide track 18 is decreased significantly. This improved stability provides for consistent functioning of the piston shafts 26 to linearly displace the sealing plugs 30 for the water conditioner valve. In addition, such stability also greatly contributes to improved durability of the scotch yoke mechanism 10 since there is less friction between the surface of sliding formation 16 and the slide track 18.

In addition to the upper and lower surfaces 68, 70, the guide 14 also has two ends. The first end 90 refers to the end with the bracket 34, and a second end 92 oppositely located. The first end 90 has two threaded bores 94, each with a complementary threaded fastener 36 for mounting of the bracket 34 onto the guide 14. Each threaded bore 94 and its complementary threaded fastener 36 are located on either side of the slide track 16, as more clearly shown in FIG. 4. However, the bracket 34 can be mounted onto the guide 14 in a number of ways, including casting, molding, welding and chemical adhesives may be used and are within the scope of the invention.

Regardless of the mounting method used, the bracket 34 is preferably mounted to the guide 14 in such a way so that it is generally aligned with the slide track 16. As shown in phantom in FIG. 3, the length of the piston shaft will define the other end of the linear travel path of the yoke member 12. Because of the motor 21 being directly connected to the yoke member 12, the linear travel path is defined by the rotational movement generated by the motor, which stops short before the bracket 34. The bracket is generally used for attachment to the motor mount connected to the valve body. But it should be noted that it is not necessary to mount a bracket 34 onto the guide 14. In such a case, the guide would be configured without the threaded bores 94 and threaded fastener 36 and is within the scope of the invention.

The motor drive shaft 21a engages the crank 20 connected to the yoke member 12 through the pin 22. In particular, the pin 22 is disposed within the arcuate slot 24 of the yoke member 12, and moves within it using the rotational force exerted from the motor drive shaft 21a. The rotation movement of the pin 22 then causes yoke member 12 to reciprocate linearly on the guide 14. Since there is a piston shaft 26 attached to the yoke member 12, the reciprocating sliding motion from the yoke member is transferred onto the piston shaft. In turn, the piston shaft 26 transfers the linear reciprocal motion onto the piston 30 for the water conditioner valve. The reciprocating linear motion of the scotch yoke drive mechanism 10 is transfer to the preferred water conditioner valve system, thus, the reliable consistent functioning of the scotch yoke drive mechanism is critical. The present yoke member 12 overcomes the tendency of prior art scotch yoke mechanisms to misalign from the guide because of the many angular forces exerted during operation, especially upon the piston shaft 26.

More specifically, the present dovetail configuration of the sliding formation 16 of the yoke member 12 and the slide track 18 on the guide 16 provides for a more secure maintenance of yoke alignment during operational reciprocating sliding motion. Consequently, smoother sliding movements are achieved, resulting in better wearability since friction between the sliding formation 16 and sliding track 18 is reduced. Furthermore, smoother movements also maintain yoke alignment under a variety of angular stresses. Lastly, the reliability and tendency of the present sliding formation 16 to be positively engaged in the sliding track 18 translates to consistent functioning of the water conditioner valve system in the face of extended operational use and wear.

While a particular embodiment of the scotch yoke drive mechanism for a water softener valve control has been shown and described, it will be appreciated by those skilled in the art that changes and modifications may be made thereto without departing from the invention in its broader aspects and as set forth in the following claims.

What is claimed is:

1. A reciprocating scotch yoke drive mechanism connectable to a motor drive shaft, comprising:

a yoke member connectable to the shaft which moves said yoke member in a linear reciprocating motion;

a guide having at least one slide track configured to defined a reciprocal sliding path for said yoke member;

said yoke member has a sliding formation configured for slidingly engaging said at least one slide track;

said sliding formation and said at least one slide track having complementary configurations for maintaining alignment of said yoke member during reciprocal sliding motion and for engagement of said yoke member in said at least one slide track under a variety of angular stresses;

said sliding formation has a pair of inclined surface portions for securing said yoke member within said at least one slide track;

said at least one slide track has inclined surface portions defining said reciprocal sliding path, and configured for complementarily engaging said inclined surface portions of said sliding formation; and said engagement between said complementary inclined surface portions of said sliding formation and said slide track providing the only alignment mechanism for said yoke member for reciprocal movement, and;

said yoke member includes a socket at one end thereof and said guide includes a bracket diposed on one end of said at least one slide track, said bracket having a groove configured for slidably receiving said socket.

2. The drive mechanism as defined in claim 1, wherein said at least one slide track has a base with a width and a pair of walls having upper ends defining a longitudinal opening.

3. The drive mechanism as defined in claim 2, wherein said longitudinal opening is narrower than said base for securing said yoke member on said at least one slide track.

4. The drive mechanism as defined in claim 2, wherein said base includes a recess portion extending partially along said at least one slide track for minimizing friction caused by said yoke member reciprocating in said at least one slide track.

5. The drive mechanism as defined in claim 1, wherein said yoke member further includes an arcuate slot configured for receiving a crank connected to the motor drive shaft.

6. The drive mechanism as defined in claim 1, wherein the mechanism is configured for use with a control valve including the piston shaft, and said yoke member is provided with the socket configured for receiving the at least one piston shaft.

7. The drive mechanism as defined in claim 6, wherein said socket has an axis, and said yoke member includes at least one transverse throughbore configured for receiving a locking member.

8. The drive mechanism as defined in claim 1, wherein said yoke member includes a socket at one end thereof and said guide includes a bracket disposed on one end of said at least one slide track, said bracket having a groove configured for slideably receiving said socket.

9. A reciprocating scotch yoke drive mechanism connectable to a motor drive shaft, comprising:

a yoke member connectable to the shaft which moves said yoke member in a linear reciprocating motion;

a guide having at least one slide track configured to defme a reciprocal sliding path for said yoke member;

said yoke member has a sliding formation configured for slidingly engaging said at least one slide track;

said sliding formation and said at least one slide track having complementary configurations for maintaining alignment of said yoke member during reciprocal sliding motion and for engagement of said yoke member in said at least one slide track under a variety of angular stresses; and said yoke member includes a socket at one end thereof and said guide includes a bracket disposed on one end of said at least one slide track, said bracket having a groove configured for slideably receiving said socket.

* * * * *

UNITED STATES PATENT AND TRADEMARK OFFICE
CERTIFICATE OF CORRECTION

PATENT NO.    : 6,330,835 B1                                             Page 1 of 1
DATED         : December 18, 2001
INVENTOR(S)   : Klava et al.

It is certified that error appears in the above-identified patent and that said Letters Patent is hereby corrected as shown below:

<u>Column 6,</u>
Line 13, delete "defined" and insert -- define --.
Lines 32-36, delete ", and; said yoke member includes a socket at one end thereof and said guide includes a bracket diposed on one end of said at least one slide track, said bracket having a groove configured for slidably receiving said socket" and insert -- . --.
Line 54, delete "the" and insert -- at least one --.
Line 55, delete "the" and insert -- at least one --.

Signed and Sealed this

Twenty-second Day of October, 2002

*Attest:*

*Attesting Officer*

JAMES E. ROGAN
*Director of the United States Patent and Trademark Office*

UNITED STATES PATENT AND TRADEMARK OFFICE
CERTIFICATE OF CORRECTION

PATENT NO.    : 6,330,835 B1
DATED         : December 18, 2001
INVENTOR(S)   : Klava et al.

It is certified that error appears in the above-identified patent and that said Letters Patent is hereby corrected as shown below:

<u>Title page,</u>
Item [73], Assignee, delete "U.S." and insert -- United States -- before "Filter Corporation" to read "United States Filter Corporation".

Signed and Sealed this

Twenty-fourth Day of May, 2005

JON W. DUDAS
*Director of the United States Patent and Trademark Office*